(12) United States Patent
Feng

(10) Patent No.: US 10,703,893 B2
(45) Date of Patent: Jul. 7, 2020

(54) POWER TRANSMISSION BELT

(71) Applicant: Gates Corporation, Denver, CO (US)

(72) Inventor: Yuding Feng, Rochester Hills, MI (US)

(73) Assignee: Gates Corporation, Denver, CO (US)

( * ) Notice: Subject to any disclaimer, the term of this patent is extended or adjusted under 35 U.S.C. 154(b) by 1104 days.

(21) Appl. No.: 14/421,749

(22) PCT Filed: Aug. 14, 2013

(86) PCT No.: PCT/US2013/054981
§ 371 (c)(1),
(2) Date: Feb. 13, 2015

(87) PCT Pub. No.: WO2014/028641
PCT Pub. Date: Feb. 20, 2014

(65) Prior Publication Data
US 2015/0218357 A1    Aug. 6, 2015

Related U.S. Application Data

(60) Provisional application No. 61/683,511, filed on Aug. 15, 2012.

(51) Int. Cl.
*C08L 23/16* (2006.01)
*F16G 1/06* (2006.01)
(Continued)

(52) U.S. Cl.
CPC .............. *C08L 23/16* (2013.01); *B29D 29/08* (2013.01); *C08K 5/09* (2013.01); *F16G 1/06* (2013.01); *F16G 1/08* (2013.01); *F16G 1/28* (2013.01); *F16G 5/04* (2013.01); *F16G 5/06* (2013.01); *F16G 5/20* (2013.01); *C08L 23/0869* (2013.01); *C08L 23/0876* (2013.01); *C08L 33/02* (2013.01); *Y10T 428/1386* (2015.01)

(58) Field of Classification Search
None
See application file for complete search history.

(56) References Cited

U.S. PATENT DOCUMENTS 3,454,676 A    7/1969   Busse
5,281,651 A *  1/1994   Arjunan ................... C08L 9/02
                                                        524/519
(Continued)

FOREIGN PATENT DOCUMENTS

CN    101492549 A    7/2009
CN    101885917 A    11/2010
(Continued)

OTHER PUBLICATIONS

JP10087900A (1998), Machine Translation.*
(Continued)

*Primary Examiner* — Callie E Shosho
*Assistant Examiner* — Patrick N English
(74) *Attorney, Agent, or Firm* — Paul N. Dunlap, Esq.

(57) ABSTRACT

A power transmission belt or hose or other dynamic article with an elastomeric body comprising a rubber composition that includes an ionomeric polymer additive, such as an ethylene-methacrylic acid copolymer or a butyl ionomer. The rubber body exhibits improved crack growth resistance over the same body composition without the ionomer additive.

5 Claims, 3 Drawing Sheets

(51) Int. Cl.

| | | |
|---|---|---|
| *F16G 5/04* | (2006.01) | |
| *F16G 1/28* | (2006.01) | |
| *F16G 5/20* | (2006.01) | |
| *B29D 29/08* | (2006.01) | |
| *F16G 1/08* | (2006.01) | |
| *F16G 5/06* | (2006.01) | |
| *C08K 5/09* | (2006.01) | |
| *C08L 23/08* | (2006.01) | |
| *C08L 33/02* | (2006.01) | |

(56) References Cited

U.S. PATENT DOCUMENTS

| | | | |
|---|---|---|---|
| 5,605,967 | A | 2/1997 | Egashira et al. |
| 6,012,991 | A * | 1/2000 | Kim .................. A63B 37/0003 473/374 |
| 6,609,990 | B2 | 8/2003 | Kopang |
| 6,794,472 | B2 | 9/2004 | Harris et al. |
| 6,855,082 | B2 | 2/2005 | Moncrief et al. |
| 6,921,791 | B2 | 7/2005 | Lenox et al. |
| 7,662,480 | B2 | 2/2010 | Resendes et al. |
| 7,915,333 | B2 | 3/2011 | Resendes et al. |
| 7,989,548 | B2 * | 8/2011 | Descombes ......... C08L 23/0869 525/167 |
| 8,026,304 | B2 | 9/2011 | Rajagopalan et al. |
| 8,063,171 | B2 | 11/2011 | Klein |
| 9,045,626 | B2 | 6/2015 | Adkinson et al. |
| 2003/0050144 | A1 | 3/2003 | Moncrief et al. |
| 2008/0058121 | A1 * | 3/2008 | Comeau ............ A63B 37/0093 473/351 |
| 2008/0081872 | A1 | 4/2008 | Osman |
| 2009/0062551 | A1 | 3/2009 | Tournilhac et al. |
| 2009/0142572 | A1 | 6/2009 | Burlett |
| 2009/0299000 | A1 * | 12/2009 | Resendes ............... C08F 210/12 524/576 |
| 2010/0010140 | A1 | 1/2010 | Resendes et al. |
| 2010/0300571 | A1 | 12/2010 | Miller et al. |
| 2011/0003872 | A1 | 1/2011 | Tournilhac et al. |
| 2011/0129647 | A1 | 6/2011 | Duke et al. |
| 2011/0143864 | A1 * | 6/2011 | Sullivan ............ A63B 37/0031 473/376 |
| 2011/0184087 | A1 | 7/2011 | Campomizzi et al. |
| 2013/0131647 | A1 | 5/2013 | Nielsen |
| 2015/0368387 | A1 | 12/2015 | Nosaka et al. |

FOREIGN PATENT DOCUMENTS

| | | | |
|---|---|---|---|
| JP | 10087900 | A * | 4/1998 |
| JP | H10-87900 | A | 4/1998 |
| JP | 10204203 | A | 8/1998 |
| JP | 2003176388 | A | 6/2003 |
| JP | 2003342466 | A | 12/2003 |
| JP | 2005206303 | A | 8/2005 |
| JP | 2007171478 | A | 7/2007 |
| JP | 2010235685 | A | 10/2010 |
| JP | 2011105856 | A | 6/2011 |
| JP | 2012-025118 | A | 2/2012 |
| WO | 90/04617 | A1 | 5/1990 |
| WO | 2009059108 | A1 | 5/2009 |
| WO | 2009065100 | A1 | 5/2009 |
| WO | 2010091498 | A1 | 8/2010 |

OTHER PUBLICATIONS

Fall, Puncture Reversal of Ethylene Ionomers—Mechanistic Studies, Masters Thesis for Virginia Polytechnic Institute and State University, Aug. 29, 2001, pp. 1, 17.*
European Patent Office, Communication Pursuant to Article 94(3) EPC, dated Mar. 24, 2016.
State Intellectual Property Office of People's Republic of China, Notification of the First Office Action application No. 201380043022.X, dated Mar. 7, 2016.
European Patent Office, International Search Report PCT/US2013/054981, dated Dec. 20, 2013.
Stephen James Kalista, Jr., Self-Healing Thermoplastic Poly(Ethylene-co-Methacrylic Acid) Copolymers Following Projectile Puncture, Thesis submitted to the faculty of Virginia Polytechnic Institute and State University, Sep. 1, 2003 Blacksburg, Virginia.
Stephen J Kalista, Jr and Thomas C Ward, Thermal characteristics of the self-healing response in polyethylene-co-methacrylic acid) copolymers, Journal of the Royal Society Interface, Published online Nov. 21, 2006. doi: 10.1098/rsif.2006.0169.
Dupont de Nemours and Company, Inc., DuPont Packaging & Industrial Polymers, Nucrel® resins Product Data Sheet, DuPont™ Nucrel® 925, http://nucrel.dupont.com.
Dupont, DuPont Industrial Polymers: Nucrel® General Product Information,http://www.dupont.com/industrial-polymers/nucrel/H-41675-1.html.
Y. C. Yuan, T. Yin1 M. Z. Rong, M. Q. Zhang, Self healing in polymers and polymer composites. Concepts, realization and outlook: A review, Zhongshan University, Guangzhou 510275, P. R. China, eXPRESS Polymer Letters vol. 2, No. 4 (2008) 238-250 Available online at www.expresspolymlett.comDOI: 10.3144/expresspolymlett.2008.29.
Nancy Sottos, Scott White, and Ian Bond, Introduction:self-healingpolymersandcomposites, J.R.Soc. Interface (2007)4,347-348doi:10.1098/rsif.2006.0205, Published online Feb. 20, 2007.
Dupont, DuPont Packaging & Industrial Polymers, DuPont™ Surlyn® 8920, Surlyn® resins Product Data Sheet, Jan. 7, 2010 8:47 AM Copyright E.I. du Pont de Nemours and Company, Inc.
Dupont, DuPont Packaging & Industrial Polymers, DuPont™ Surlyn® 8940, Surlyn® resins Product Data Sheet, Jan. 7, 2010 8:50 AM Copyright E.I. du Pont de Nemours and Company, Inc.
Dupont, Surlyn® thermoplastic resins, Product Information, Product and Properties Overview, www.surlyn.dupont.com.
Anthony Martin John Porter, Imidazolium Ionomer Derivatives of Poly(isobutylene-co-isoprene), Queen's University Kingston, Ontario, Canada Oct. 2010.
Rebecca Fall, Puncture Reversal of Ethylene Ionomers—Mechanistic Studies, Virginia Polytechnic Institute and State University, Aug. 29, 2001, Blacksburg, Virginia.
Japanese Patent Office, Japanese Office Action letter, dated May 23, 2017.
Korean Intellectual Property Office, Office Action, Korean application No. 10-2015-7006422, dated Dec. 6, 2018.

* cited by examiner

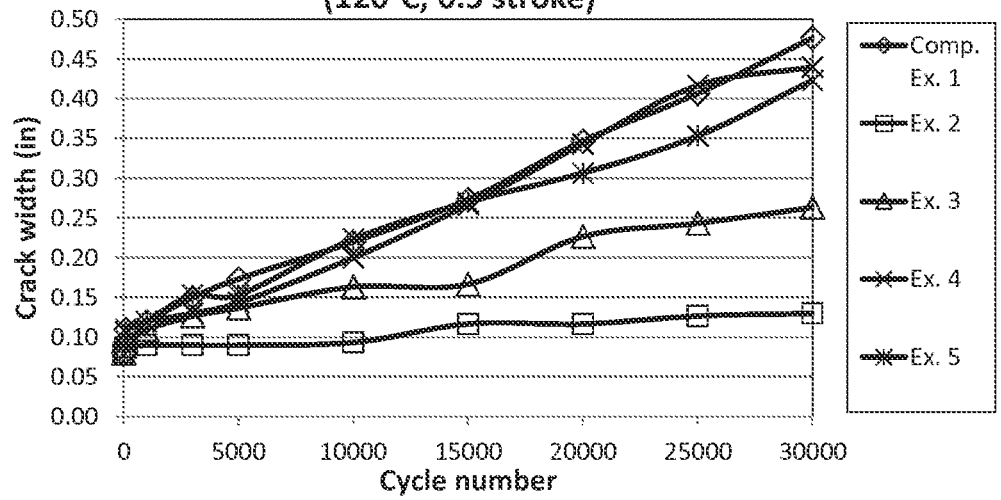
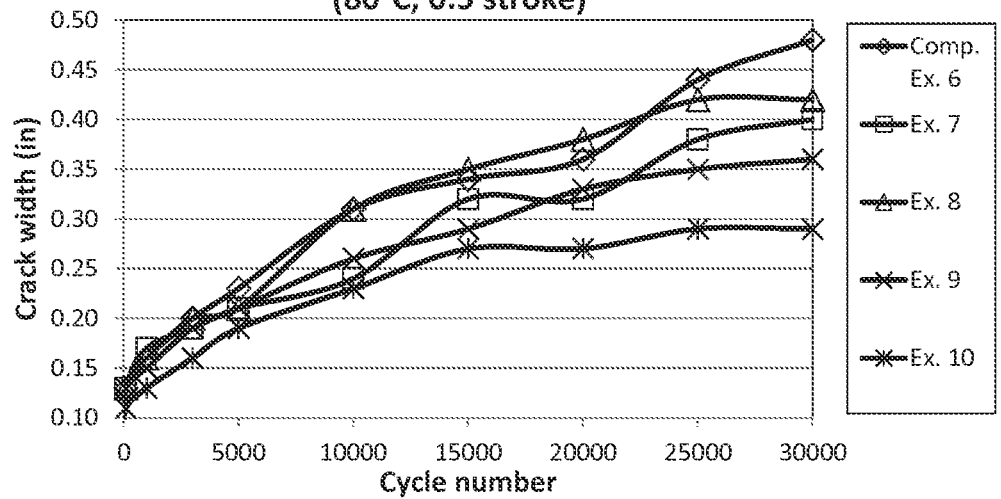

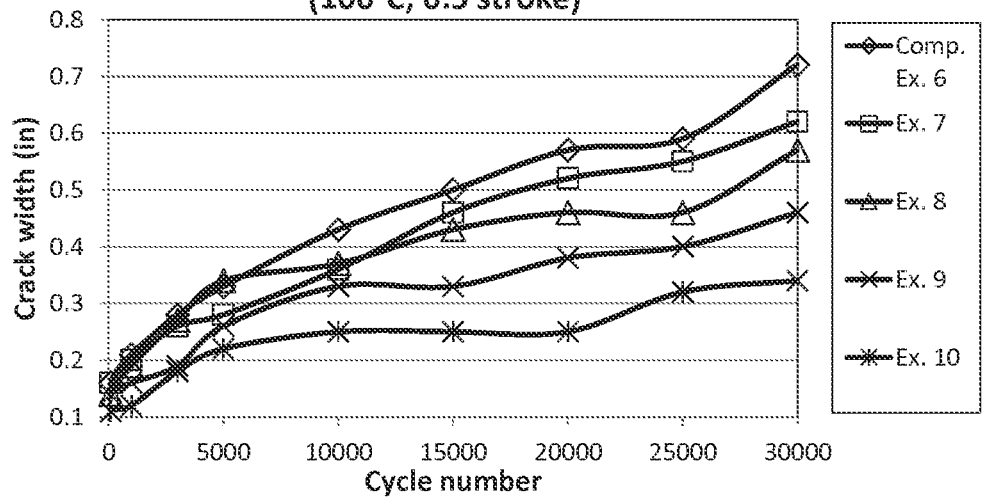
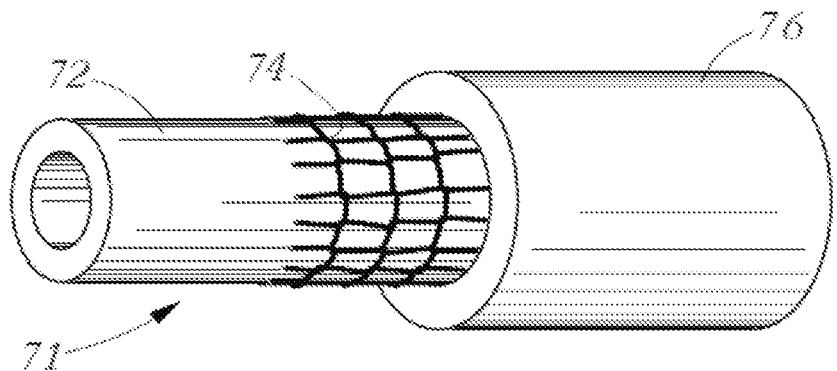
FIG. 7

POWER TRANSMISSION BELT

BACKGROUND OF THE INVENTION

Field of the Invention

This invention relates generally to use of ionomers (ionic polymers) in rubber articles in dynamic applications, more particularly to a power transmission belt with an ionomeric additive in the rubber compound, and specifically to polyethylene-co-methacrylic acid ionomers and butyl ionomers in rubber belts and hose.

Description of the Prior Art

Ionomers are multiphase polymers that contain low levels of ionic groups (typically less than 15 mole %) along the hydrocarbon backbone. Small amounts of ionic functionality bound to polymers of low dielectric constant (such as butyl rubber, "BIIR") can significantly affect material properties: since the non-polar backbone cannot solvate the ionic components, there is significant ion pair aggregation. The ions associate through multiplets of ions to create networks that can have dynamic mechanical properties similar to vulcanizates (covalently crosslinked polymeric materials). Multiplets are aggregations of several ion pairs that have come together under ionic association in a non-polar polymer background. This allows fillers like carbon black to interact with the ionic groups. Literature work demonstrated that both onium ion-exchanged montmorillonite clay and precipitated silica resulted in reduced filler agglomeration and higher degree of reinforcement when added to ionomer (compared to the nonionic base polymer). Besides having different bond types (ionic versus covalent), the ionomers differ from vulcanizates in that they have creep behavior; when large strain is induced on the ionomers, the ions hop to different multiplets causing creep, whereas covalent bonds break irreversibly if sufficient strain is applied to the vulcanizates.

Ionomers of many types, whether based on styrene, ethylene, butadiene, urethane or sulfones, have been used for successful industrial applications. These applications include using ionomers as membranes or thin films, in fuel cells, packaging, coatings in the fertilizer industry, floor polishes, and adhesives. The addition of ionic character to a polymer can significantly affect the physical characteristics and strongly influences the glass transition temperature, modulus, viscosity, and optical features. The coulombic interactions due to ionic groups play a major role in contributing to such properties as tear resistance, toughness, flexibility, melt strength, and the use of ionomers as additives for the purpose of enhancing miscibility.

Self-healing effects in polymers and polymer composites have been the subject of active research programs for a number of years. An academic review article, Y. C. YUAN, et al. "Self healing in polymers and polymer composites. Concepts, realization and outlook: A review," *eXPRESS Polymer Letters*, Vol. 2, No. 4 pp 238-250 (2008), concludes that achievements in the field are "far from satisfactory," and it is very challenging to invent polymers that actually self-heal cracks, whether used alone (inherently) or in an integrated healing system.

SUMMARY

The present invention is directed to compositions, systems and methods which provide improvements in flex crack growth performance in rubber compounds for power transmission belts, hose, or other rubber articles subjected to dynamic forces.

The invention is directed to a power transmission belt or hose or other dynamic article with an elastomeric body that is formed from a rubber composition that includes an ionomeric polymer additive, such as an ethylene-methacrylic acid copolymer or a butyl ionomer. The rubber body exhibits improved crack growth resistance over the same body composition without the ionomer additive. The ionomer additive may be added to the rubber composition at a concentration of up to 50 phr. The invention is also directed to a method of improving crack growth resistance in a rubber composition for a dynamic article by adding an ionomer additive to the rubber composition.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 4 is a graph of DeMattia crack growth at 120° C. for examples 1-5;

FIG. 5 is a graph of DeMattia crack growth at 80° C. for examples 6-10;

FIG. 6 is a graph of DeMattia crack growth at 100° C. for examples 6-10; and

FIG. 7 is a perspective view, with parts in section, of a portion of a hose constructed in accordance with an embodiment of the present invention.

DETAILED DESCRIPTION

Figure 1:
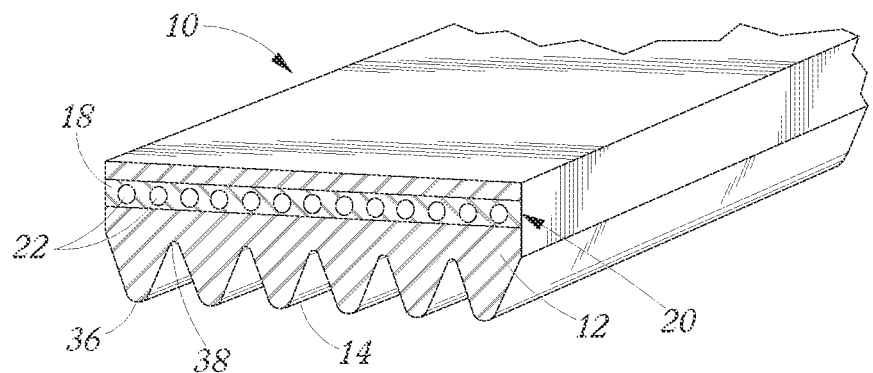
FIG. 1 is a perspective view, with parts in section, of a portion of a multi-V-ribbed belt constructed in accordance with an embodiment of the present invention.

The invention is directed to the use of ionomer additives in rubber compounds to improve flex crack growth performance for dynamic rubber products such as belts. It is thought the mechanism for the improvement may be a form of self-healing behavior based on breaking and reforming of ionic bonds, ion clusters or ionic crosslinks between polymer chains in the compound.

"Ionomer" refers herein to a polymer having ionic groups which can associate to form ionic domains or form ionic links between polymer chains. The ionic links may include hydrogen bonding. The term "ionomeric polymer" is used herein interchangeably with ionomer. The term "additive" is used for materials or ingredients in a rubber compound which make up less than 50% by weight of the total compound, preferably less than 100 phr. The term "rubber" refers to a material capable of recovering from large deformations quickly and forcibly, and which is essentially insoluble in boiling solvents (due the presence of covalent crosslinks). Other useful definitions may be found in ASTM D-1566, which is hereby incorporated herein by reference.

Two embodiments of the invention were investigated in detail, utilizing polyethylene-co-methacrylic acid (EMAA) and butyl ionomer as the self-healing ingredient, respectively.

In the examples according to the first embodiment of the invention, EMAA was used as an additive to put into a fiber-loaded ethylene-propylene-diene elastomer (EPDM) belt compound. DeMattia rubber crack growth test method was used to monitor the material crack growth. The effect of EMAA on the rubber material's static and dynamic mechanical properties was investigated as well. Two EMAA types manufactured by DuPont were used in this work, namely, EMAA and partially neutralized EMAA copolymers.

Nucrel® is a thermoplastic EMAA random copolymer sold by DuPont under that trade name. The Nucrel® 925 copolymer contains 85 weight % ethylene and 15 weight % methacrylic acid (MA), i.e., 5.4 mole % MA groups randomly distributed along the polymer chains. Nucrel® 925 has a greater average molecular weight than Surlyn® 8920. Nucrel® is commonly used as a thermoplastic molding resin or coating resin in applications involving footwear, wire and cable coating, metal coating, and glass coating. It is tough and flexible, lightweight in nature, and easy to colorize. Nucrel® was obtained as a pelletized resin from DuPont.

Surlyn® is a thermoplastic EMAA random ionomer sold under that trade name by DuPont. It is the partially neutralized version of Nucrel®. Surlyn® 8920 used in the course of this study contains 5.4 mole % MA groups, but has 60% of its MA groups neutralized with sodium cations. Surlyn® 8920 resin is formulated to provide excellent clarity, stiffness and abrasion resistance. Surlyn® 8920 is commonly used in a number of applications including golf ball covers, hockey helmets and ski boots. Surlyn® 8920 resin was obtained from DuPont in pelletized form. DuPont describes Surlyn® ionomer resins as high-performance ethylene copolymers containing acid groups partially neutralized using metal salts such as zinc, sodium, magnesium, lithium, and others. Ionic interactions make it a strong thermoplastic with enhanced physical properties versus conventional plastics. The DuPont manufacturing process for Surlyn® reportedly provides tailored combinations of properties such as resilience, hardness and stiffness, and resistance to cuts and abrasion—all highly desirable for golf ball applications.

Table 1 shows a first set of compound recipes used in this work. Comp. Ex. 1 is a representative fiber-loaded EPDM formulation for use in a power transmission belt, and used here as the control. Nucrel® 925 and Surlyn® 8920 were added at 4 phr and 8 phr, respectively, in Ex. 2-5, respectively. "Phr" indicates concentration of an additive in a rubber compound in parts weight per hundred parts of the base elastomer.

Table 2 shows the compound properties for the compounds of Table 1 used in this work. Mooney viscosity (MV) and scorch time (t5) were tested at 121° C. for 30 minutes according to ASTM D1646. The Mooney viscosity increased around 20 points with the addition of EMAA. It may be explained by the high molecular weight of the Nucrel and the strong ionomer interaction of Surlyn. At the test temperature (121° C.), all variables have scorch time (t5) around 30 minutes. The EMAA therefore has no adverse affect on scorch resistance. Cure characteristics were tested on the moving die rheometer (MDR) at 177° C. for 30 minutes according to ASTM D5289. The scorch time, indicated by Ts2 again showed no effect, while the viscosity, ML, increased from the addition of EMAA. The cure rate, indicated by t90, increased a little bit with the addition of EMAA, but the modulus after cure (indicated by MH or MH-ML) decreased somewhat.

TABLE 1

| Ingredients[1] | Comp. Ex. 1 | Ex. 2 | Ex. 3 | Ex. 4 | Ex. 5 |
|---|---|---|---|---|---|
| EPDM[2] | 100.0 | 100.0 | 100.0 | 100.0 | 100.0 |
| N330 Carbon Black | 58.6 | 58.6 | 58.6 | 58.6 | 58.6 |
| Zinc Stearate | 2.8 | 2.8 | 2.8 | 2.8 | 2.8 |
| Anti-oxidant | 1.0 | 1.0 | 1.0 | 1.0 | 1.0 |
| Coagent | 16.5 | 16.5 | 16.5 | 16.5 | 16.5 |
| Cotton Flock | 29.3 | 29.3 | 29.3 | 29.3 | 29.3 |
| Nucrel ® 925 | 0.0 | 4.0 | 8.0 | 0.0 | 0.0 |
| Surlyn ® 8920 | 0.0 | 0.0 | 0.0 | 4.0 | 8.0 |
| Paraffin Oil | 9.8 | 9.8 | 9.8 | 9.8 | 9.8 |
| Vulcup 40KE | 3.91 | 3.91 | 3.91 | 3.91 | 3.91 |
| Scorch Retarder | 0.28 | 0.28 | 0.28 | 0.28 | 0.28 |

[1]amounts are in phr.
[2]70 wt % ethylene, 4.5 wt % ENB, 59 Mooney Viscosity ML 1 + 4 @ 257° F.

Compound physical properties are also shown in Table 2. The compound original and aged hardness compare quite closely. Hardness was tested according to ASTM D2240 on the Shore A scale. It can be seen that the addition of EMAA slightly increased hardness, particularly after the heat aging. Tear strength was tested with die-C according to ASTM D624. There is very little change in compound tear strength with the addition of EMAA. Tearing on this test generally occurs very fast, so there is no time for any crack healing to take place.

Tensile properties shown in Table 2 were tested according to ASTM D412, die C. Tensile results at low strain for materials in with-grain (WG) and cross-grain (XG) directions show that the addition of EMAA increased compound modulus in the with-grain direction, but has little affect in the cross-grain direction. Tensile modulus is reported as stress at given elongation in accordance with ASTM D1566 and D412. The ultimate tensile properties, strength and elongation, show little affect from the EMAA.

Compound dynamic properties, shown in Tables 3 and 4 were measured with an RPA tester according to the procedure of ASTM D6601. The comparison in Table 3 included frequency sweeps at 100, 80 and 66° C. and at ±6.98% strain, and Table 4 shows a strain sweep at 66° C., at a frequency of 1.667 Hz. It was seen that the addition of EMAA had little influence on compound elastic modulus (G'). However, the damping factor, tan δ, increased with the addition of EMAA.

DeMattia crack growth was determined in accordance with ASTM D813. This test follows the growth of an initial crack over the course of many flexing cycles. The test was carried out at 120° C. and with 0.5" stroke on a pierced specimen. It can be seen from the results in Table 2 that the addition of EMAA improved material crack resistance significantly, especially Nucrel® 925. In particular, addition of relatively small amounts of EMAA significantly slows the crack growth rate in rubber on the DeMattia test.

In summary of the first embodiment investigated, ionomer material EMAA was evaluated in a fiber-loaded EPDM belt compound. It is hypothesized that the self-healing behavior of EMAA resulted in improved crack resistance. It was found that the addition of EMAA increased material MV, damping factor tan δ, cure speed and with-grain modulus. EMMA had little influence on scorch time, material dynamic elastic modulus, and other physical properties (such as tensile, elongation, tear, hardness). The addition of EMAA (especially the acidic grade, Nucrel® 925) improved the rubber material's crack resistance significantly, by reducing the crack growth rate on the DeMattia test. FIG. 4 shows the DeMattia crack growth progress versus number of cycles graphically for the first series of examples. The improvement due to the Nucrel® 925 EMAA additive is dramatic, especially at only 4 phr loading.

TABLE 2

| Properties | Comp. Ex. 1 | Ex. 2 | Ex. 3 | Ex. 4 | Ex. 5 |
|---|---|---|---|---|---|
| Rheological Properties | | | | | |
| MV 1 + 2 @ 121° C., (MU) | 98.04 | 111.51 | 118.88 | 111.08 | 114.02 |
| t5 @ 121° C., (30 min.) (min) | >30 | 27.33 | >30 | 27.51 | 30.10 |
| Ts2 @ 177° C. (30 min.) (min) | 0.63 | 0.67 | 0.63 | 0.64 | 0.61 |
| T90 @ 177° C. (30 min.) (min) | 4.62 | 4.35 | 4.07 | 4.55 | 4.38 |
| ML @ 177° C. (30 min.) (in-lb) | 2.20 | 3.08 | 3.33 | 3.02 | 3.03 |
| MH @ 177° C. (30 min.) (in-lb) | 38.03 | 32.84 | 31.28 | 34.85 | 33.10 |
| Original RT Physical Properties | | | | | |
| Hardness (Shore A) | 87 | 88 | 88 | 88 | 88 |
| Tensile strength (WG) (psi) | 2241 | 2222 | 2000 | 2265 | 2097 |
| Elongation (WG) (%) | 307 | 334 | 315 | 314 | 304 |
| Modulus at 5% (WG) (psi) | 455 | 472 | 476 | 533 | 526 |
| Modulus at 10% (WG) (psi) | 689 | 729 | 728 | 826 | 808 |
| Modulus at 20% (WG) (psi) | 1010 | 1083 | 1085 | 1200 | 1185 |
| Tensile strength (XG) (psi) | 2297 | 1941 | 2008 | 2017 | 1981 |
| Elongation (XG) (%) | 333 | 316 | 335 | 308 | 323 |
| Modulus at 5% (XG) (psi) | 305 | 270 | 294 | 293 | 292 |
| Modulus at 10% (XG) (psi) | 458 | 398 | 429 | 434 | 425 |
| Modulus at 20% (XG) (psi) | 662 | 563 | 606 | 619 | 595 |
| Tear strength- Die C (WG) (ppi) | 380.61 | 377.72 | 380.68 | 375.26 | 379.33 |
| Tear strength- Die C (XG) (ppi) | 358.06 | 347.39 | 368.89 | 363.63 | 342.99 |
| Compression set (150° C., 22 hrs) (%) | 50.8 | 53.8 | 57.5 | 52.3 | 54.3 |
| Aged 70 hr.@150° C. RT Physical Properties | | | | | |
| Hardness (Shore A) | 88 | 89 | 89 | 90 | 89 |
| Tensile strength (WG) (psi) | 1855 | 1907 | 1936 | 1855 | 1886 |

TABLE 2-continued

| Properties | Comp. Ex. 1 | Ex. 2 | Ex. 3 | Ex. 4 | Ex. 5 |
|---|---|---|---|---|---|
| Elongation (WG) (%) | 125 | 115 | 110 | 122 | 117 |
| Modulus at 5% (WG) (psi) | 409 | 520 | 533 | 540 | 527 |
| Modulus at 10% (WG) (psi) | 636 | 838 | 848 | 852 | 845 |
| Modulus at 20% (WG) (psi) | 972 | 1241 | 1263 | 1214 | 1216 |
| Tensile strength (XG) (psi) | 2010 | 1944 | 1946 | 1912 | 1917 |
| Elongation (XG) (%) | 189 | 185 | 177 | 178 | 173 |
| Modulus at 5% (XG) (psi) | 315 | 284 | 300 | 326 | 307 |
| Modulus at 10% (XG) (psi) | 472 | 423 | 449 | 485 | 460 |
| Modulus at 20% (XG) (psi) | 700 | 616 | 655 | 703 | 667 |
| Compression set (%) | 32.9 | 39.3 | 43.2 | 41.5 | 42.5 |
| Other Properties | | | | | |
| DeMattia test-XG (120° C., 0.5") (kilocycles/inch) | 202 | 417 | 347 | 316 | 233 |
| DeMattia test-WG (120° C., 0.5") (kilocycles/inch) | 78 | 600 | 164 | 84 | 90 |
| PICO abrasion index | 77 | 97 | 94 | 94 | 99 |

Another theory, not meant to limit the invention, is that there is some melting of thermoplastic crystalline components of the EMAA additive within the rubber during heated testing such as on the DeMattia test. Such an effect may contribute to improvement in crack growth through compound softening, or it may contribute to self-healing through increased mobility of ionomers.

TABLE 3

| | | Dynamic Properties[1] | | | | |
|---|---|---|---|---|---|---|
| Property | Frequency (Hz) | Comp. Ex. 1 | Ex. 2 | Ex. 3 | Ex. 4 | Ex. 5 |
| G' at 100° C. | 0.033 | 3212.9 | 2914.5 | 2980.9 | 3008.8 | 3041.1 |
| | 0.083 | 3280.0 | 2999.6 | 3065.3 | 3075.9 | 3111.4 |
| | 0.167 | 3364.1 | 3102.9 | 3137.6 | 3161.1 | 3181.0 |
| | 0.333 | 3454.8 | 3202.8 | 3223.9 | 3252.0 | 3233.8 |
| | 0.833 | 3581.4 | 3361.5 | 3345.5 | 3389.6 | 3347.3 |
| | 1.667 | 3722.6 | 3525.4 | 3486.2 | 3546.6 | 3459.9 |
| | 3.333 | 3828.3 | 3671.5 | 3595.5 | 3676.1 | 3563.5 |
| | 8.333 | 4077.1 | 3925.9 | 3832.3 | 3937.1 | 3765.1 |
| | 16.667 | 4223.2 | 4085.5 | 3955.3 | 4092.3 | 3922.2 |
| | 33.333 | 4392.5 | 4275.8 | 4178.4 | 4298.9 | 4091.1 |
| tan δ at 100° C. | 0.033 | 3212.9 | 2914.5 | 2980.9 | 3008.8 | 3041.1 |
| | 0.083 | 3280.0 | 2999.6 | 3065.3 | 3075.9 | 3111.4 |
| | 0.167 | 3364.1 | 3102.9 | 3137.6 | 3161.1 | 3181.0 |
| | 0.333 | 3454.8 | 3202.8 | 3223.9 | 3252.0 | 3233.8 |
| | 0.833 | 3581.4 | 3361.5 | 3345.5 | 3389.6 | 3347.3 |
| | 1.667 | 3722.6 | 3525.4 | 3486.2 | 3546.6 | 3459.9 |
| | 3.333 | 3828.3 | 3671.5 | 3595.5 | 3676.1 | 3563.5 |
| | 8.333 | 4077.1 | 3925.9 | 3832.3 | 3937.1 | 3765.1 |
| | 16.667 | 4223.2 | 4085.5 | 3955.3 | 4092.3 | 3922.2 |
| | 33.333 | 4392.5 | 4275.8 | 4178.4 | 4298.9 | 4091.1 |
| G' at 80° C. | 0.033 | 3212.9 | 2914.5 | 2980.9 | 3008.8 | 3041.1 |
| | 0.083 | 3280.0 | 2999.6 | 3065.3 | 3075.9 | 3111.4 |
| | 0.167 | 3364.1 | 3102.9 | 3137.6 | 3161.1 | 3181.0 |
| | 0.333 | 3454.8 | 3202.8 | 3223.9 | 3252.0 | 3233.8 |
| | 0.833 | 3581.4 | 3361.5 | 3345.5 | 3389.6 | 3347.3 |
| | 1.667 | 3722.6 | 3525.4 | 3486.2 | 3546.6 | 3459.9 |
| | 3.333 | 3828.3 | 3671.5 | 3595.5 | 3676.1 | 3563.5 |
| | 8.333 | 4077.1 | 3925.9 | 3832.3 | 3937.1 | 3765.1 |
| | 16.667 | 4223.2 | 4085.5 | 3955.3 | 4092.3 | 3922.2 |
| | 33.333 | 4392.5 | 4275.8 | 4178.4 | 4298.9 | 4091.1 |
| tan δ at 80° C. | 0.033 | 3212.9 | 2914.5 | 2980.9 | 3008.8 | 3041.1 |
| | 0.083 | 3280.0 | 2999.6 | 3065.3 | 3075.9 | 3111.4 |

TABLE 3-continued

Dynamic Properties[1]

| Property | Frequency (Hz) | Comp. Ex. 1 | Ex. 2 | Ex. 3 | Ex. 4 | Ex. 5 |
|---|---|---|---|---|---|---|
| | 0.167 | 3364.1 | 3102.9 | 3137.6 | 3161.1 | 3181.0 |
| | 0.333 | 3454.8 | 3202.8 | 3223.9 | 3252.0 | 3233.8 |
| | 0.833 | 3581.4 | 3361.5 | 3345.5 | 3389.6 | 3347.3 |
| | 1.667 | 3722.6 | 3525.4 | 3486.2 | 3546.6 | 3459.9 |
| | 3.333 | 3828.3 | 3671.5 | 3595.5 | 3676.1 | 3563.5 |
| | 8.333 | 4077.1 | 3925.9 | 3832.3 | 3937.1 | 3765.1 |
| | 16.667 | 4223.2 | 4085.5 | 3955.3 | 4092.3 | 3922.2 |
| | 33.333 | 4392.5 | 4275.8 | 4178.4 | 4298.9 | 4091.1 |
| G' at 66° C. | 0.033 | 3212.9 | 2914.5 | 2980.9 | 3008.8 | 3041.1 |
| | 0.083 | 3280.0 | 2999.6 | 3065.3 | 3075.9 | 3111.4 |
| | 0.167 | 3364.1 | 3102.9 | 3137.6 | 3161.1 | 3181.0 |
| | 0.333 | 3454.8 | 3202.8 | 3223.9 | 3252.0 | 3233.8 |
| | 0.833 | 3581.4 | 3361.5 | 3345.5 | 3389.6 | 3347.3 |
| | 1.667 | 3722.6 | 3525.4 | 3486.2 | 3546.6 | 3459.9 |
| | 3.333 | 3828.3 | 3671.5 | 3595.5 | 3676.1 | 3563.5 |
| | 8.333 | 4077.1 | 3925.9 | 3832.3 | 3937.1 | 3765.1 |
| | 16.667 | 4223.2 | 4085.5 | 3955.3 | 4092.3 | 3922.2 |
| | 33.333 | 4392.5 | 4275.8 | 4178.4 | 4298.9 | 4091.1 |
| tan δ at 66° C. | 0.033 | 3212.9 | 2914.5 | 2980.9 | 3008.8 | 3041.1 |
| | 0.083 | 3280.0 | 2999.6 | 3065.3 | 3075.9 | 3111.4 |
| | 0.167 | 3364.1 | 3102.9 | 3137.6 | 3161.1 | 3181.0 |
| | 0.333 | 3454.8 | 3202.8 | 3223.9 | 3252.0 | 3233.8 |
| | 0.833 | 3581.4 | 3361.5 | 3345.5 | 3389.6 | 3347.3 |
| | 1.667 | 3722.6 | 3525.4 | 3486.2 | 3546.6 | 3459.9 |
| | 3.333 | 3828.3 | 3671.5 | 3595.5 | 3676.1 | 3563.5 |
| | 8.333 | 4077.1 | 3925.9 | 3832.3 | 3937.1 | 3765.1 |
| | 16.667 | 4223.2 | 4085.5 | 3955.3 | 4092.3 | 3922.2 |
| | 33.333 | 4392.5 | 4275.8 | 4178.4 | 4298.9 | 4091.1 |

[1]RPA frequency sweeps at ±6.98% strain, in kPa units.

TABLE 4

Dynamic Properties[1]

| Property | Strain (±%) | Comp. Ex. 1 | Ex. 2 | Ex. 3 | Ex. 4 | Ex. 5 |
|---|---|---|---|---|---|---|
| G' at 66° C. | 0.7 | 5540.6 | 5657.4 | 5485.0 | 5851.6 | 5254.3 |
| | 1.4 | 4974.9 | 5071.0 | 5063.7 | 5321.4 | 4700.2 |
| | 2.79 | 4334.7 | 4418.5 | 4516.3 | 4676.3 | 4131.3 |
| | 6.98 | 3789.7 | 3734.6 | 3814.6 | 3931.1 | 3554.6 |
| | 13.95 | 3524.8 | 3315.2 | 3437.9 | 3510.8 | 3246.8 |
| | 27.9 | 2782.9 | 2501.1 | 2609.7 | 2640.9 | 2514.4 |
| | 69.75 | — | 1444.6 | 1797.9 | 1774.2 | 1814.6 |
| tan δ at 66° C. | 0.7 | 0.154 | 0.176 | 0.144 | 0.152 | 0.160 |
| | 1.4 | 0.180 | 0.197 | 0.166 | 0.172 | 0.181 |
| | 2.79 | 0.197 | 0.216 | 0.183 | 0.193 | 0.195 |
| | 6.98 | 0.180 | 0.211 | 0.183 | 0.195 | 0.191 |
| | 13.95 | 0.168 | 0.211 | 0.184 | 0.196 | 0.185 |
| | 27.9 | 0.190 | 0.231 | 0.212 | 0.224 | 0.214 |
| | 69.75 | — | 0.299 | 0.242 | 0.260 | 0.230 |

[1]RPA strain sweep at 1.667 Hz frequency; G' is in kPa units.

In the examples according to the second embodiment of the invention, butyl ionomer was used as an ionic polymer additive to put into a fiber-loaded ethylene-propylene-diene elastomer (EPDM) belt compound. The DeMattia rubber crack growth test method was used to monitor the material crack growth. The effect of the butyl ionomer on the rubber material's static and dynamic mechanical properties was investigated as well. "LanXess XLINK TP" butyl ionomer was supplied by LanXess. It is in pellet form, and the specific gravity is 0.93 g/cm$^3$. The preparation of such butyl ionomers is described for example in U.S. Pat. No. 7,662,480 B2, U.S. Pat. No. 7,915,333 B2, and U.S. Pat. Appl. Publ. No. 2010/0010140 A1, all to Resendes et al., the contents of which are hereby incorporated herein by reference. Herein, "butyl ionomer" in general refers to any of the ionomeric butyl polymers described in those patent publications.

Butyl rubber is understood to be a copolymer of an isoolefin and one or more, preferably conjugated, multiolefins as comonomers. Isoolefins within the range of from 4 to 16 carbon atoms, preferably 4-7 carbon atoms, such as isobutene, 2-methyl-1-butene, 3-methyl-1-butene, 2-methyl-2-butene, 4-methyl-1-pentene and mixtures thereof can be used. Multiolefins within the range of from 4-14 carbon atoms, such as isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof, preferably conjugated dienes, can be used. Other optional monomers known to be copolymerizable with isoolefins may also be used. Preferred commercial butyl rubbers ("IIR") have a major portion of isobutylene isoolefin (i.e., isobutene) and a minor amount, usually not more than 2.5 mole %, of the conjugated multiolefin isoprene. Butyl ionomers may be derived from butyl rubber having up to 8 mole % of the conjugated multiolefin. Butyl ionomers may be derived from halo-butyl rubber, such as brominated butyl rubber ("BIIR") by nucleophilic substitution treatment with nitrogen- and/or phosphorous-based nucleophiles. Suitable nucleophiles include trimethylamine, triethylamine, triisopropylamine, tri-n-butylamine, trimethylphosphine, triethylphosphine, triisopropylphosphine, tri-n-butylphosphine, and triphenylphosphine. Generally, the more multiolefin in the butyl polymer, the more potential bromination sites and therefore the more potential ionic functionality. The resulting high multiolefin halobutyl based ionomer preferably possesses from 0.05 to 2.0 mole %, more preferably from 0.2 to 1.0 mole % and even more preferably from 0.5 to 0.8 mole % of the ionomeric moiety and from 2 to 10 mole %, more preferably from 3 to 8 mole % and even more preferably from 4 to 7.5 mole % of multiolefin. The ionic functionality of the butyl ionomer used in this study is believed to be about 0.6 mole % and derived from BIIR having 1.8 weight % Bromine content by substituting for substantially all the bromine with ionomer groups.

Table 5 shows the compound recipes used in this example series. Comp. Ex. 6 is a representative fiber-loaded EPDM formulation for use as undercord in a V-belt, and used here as the control. Comp. Ex. 6 and 1 were the same recipe. Butyl ionomer was added at levels of 5 phr up to 20 phr in Ex. 7-10, respectively.

TABLE 5

| Ingredients[1] | Comp. Ex. 6 | Ex. 7 | Ex. 8 | Ex. 9 | Ex. 10 |
|---|---|---|---|---|---|
| EPDM[2] | 100.0 | 100.0 | 100.0 | 100.0 | 100.0 |
| N330 Carbon Black | 58.6 | 58.6 | 58.6 | 58.6 | 58.6 |
| Zinc Stearate | 2.8 | 2.8 | 2.8 | 2.8 | 2.8 |
| Anti-oxidant | 1.0 | 1.0 | 1.0 | 1.0 | 1.0 |
| Coagent | 16.5 | 16.5 | 16.5 | 16.5 | 16.5 |
| Cotton Flock | 29.3 | 29.3 | 29.3 | 29.3 | 29.3 |
| LanXess XLINK TP | 0.0 | 5.0 | 10.0 | 15.0 | 20.0 |
| Paraffin Oil | 9.8 | 9.8 | 9.8 | 9.8 | 9.8 |
| Vulcup 40KE | 3.91 | 3.91 | 3.91 | 3.91 | 3.91 |
| Scorch Retarder | 0.28 | 0.28 | 0.28 | 0.28 | 0.28 |

[1]amounts are in phr.
[2]70 wt % ethylene, 4.5 wt % ENB, 59 Mooney Viscosity ML 1 + 4 @ 257° F.

Table 6 shows the compound properties for the second set of examples. MV and t5 were tested at 121° C. for 30 minutes as in the first set of examples. There is not much change in material Mooney viscosity (MV1+2) with the addition of the ionomer, but scorch safety time (t5) is longer. Vulcanization characteristics were tested on the MDR at 177° C. for 30 minutes. The cure speed increased a little bit with the addition of the ionomer, but the cured modulus, MH, decreased a little bit for the highest loadings, Ex. 9 and 10. This phenomenon is similar to that observed in the EMAA ionomer series.

Compound dynamic properties were compared by measurements on an RPA tester according to the procedure of ASTM D6601. The comparison included frequency sweeps at 100, 80 and 66° C., at ±6.98% strain (Table 7), and a strain sweep at 66° C. (Table 8), at a frequency of 1.667 Hz. It can be seen from the results in Tables 7 and 8 that the addition of the butyl ionomer has little influence on compound elastic modulus (G'). The damping factor, tan δ, exhibited a little change due to addition of the butyl ionomer, generally increasing somewhat.

Various compound physical properties are included in Table 6. Table 6 compares the compound original and aged hardness. It can be seen that the addition of the butyl ionomer has little influence on material hardness.

Table 6 also compares tensile results for materials in with-grain directions for original samples tested at room temperature and 80° C., original and oven aged (150° C., 70 hrs) but tested at room temperature. The addition of the butyl ionomer decreased material tensile strength, but not much influence on modulus at low strain area (<10%) was seen.

Table 6 shows tensile property, tear strength, and compression set comparisons for the second example series. Compression set was tested with according to ASTM D395, Method B. The addition of the butyl ionomer decreased material tear strength. Table 6 shows the comparison of compression set for original material and heat aged material (150° C., 70 hrs.). The addition of the butyl ionomer increased the material compression set. Table 6 also reports Pico abrasion index, tested in accordance with ASTM D2228. The addition of the ionomer lowered the material's abrasion resistance (i.e., decreased the index).

DeMattia crack growth results are shown in Table 6 (tested per ASTM D813). The test was carried out at 80° C., 0.5" stroke and at 100° C., 0.5" stroke. It can be seen that the addition of the butyl ionomer improves the rubber material's crack resistance, significantly increasing the number of cycles required to grow the initial crack to one inch width. For the hotter test, at 100° C., the growth rate was cut in half for the highest loading of butyl ionomer (Ex. 10). FIGS. 5 and 6 show the DeMattia crack growth progress versus number of cycles graphically for the 80° and 100° C. tests, respectively. The improvement due to the ionomer additive is dramatic and increasingly so as the level of ionomer increases.

Finally, Table 6 shows the tension fatigue life test results tested in accordance with ASTM D4482 on Comp. Ex. 6 and Ex. 10. The test was carried out at 80° C., at a strain of 100% (i.e., an extension ratio of 2.0), with a 0.5 N preload. It can be seen that the material fatigue life increased for the inventive example (Ex. 10) versus the control, being about double from the addition of 20 phr of butyl ionomer.

In summary of the second series of examples, Lanxess butyl ionomer material was evaluated in a fiber loaded EPDM belt compound. The results are believed to demonstrate the self-healing behavior of ionomer material as an additive in rubber materials for improving crack growth resistance. It was found that the addition of the butyl ionomer has little influence on EPDM material MV, dynamic mechanical property and modulus at lower strain. Butyl ionomer increased material compression set, and decreased material tensile strength, tear strength and abrasion property. The addition of the ionomer improved material crack resistance significantly. In the case of butyl ionomer, it is believed that thermoplastic melting is not a factor because the ionomer is not semi-crystalline like the EMAA. The observed self-healing or crack resistance is hypothesized to be due to ionic rearrangements.

Possible mechanisms of self-healing for ionomeric polymers are described in Stephen James Kalista, Jr., "Self-Healing of Thermoplastic Poly(Ethylene-co-Methacrylic Acid) Copolymers Following Projectile Puncture," Virg. Polytechnic Inst., Master's Thesis (Sep. 1, 2003), and the contents of which are hereby incorporated by reference. However, the mechanisms in the rubber compounds and mixtures of the present invention may be significantly different than in the neat polymers described by Kalista. In addition, the application of rubber compounds in belts is considered very different from Kalista's application to projectile puncture testing.

TABLE 6

| Properties | Comp. Ex. 6 | Ex. 7 | Ex. 8 | Ex. 9 | Ex. 10 |
|---|---|---|---|---|---|
| Rheological Properties | | | | | |
| MV 1 + 2 @ 121° C., (MU) | 87.63 | 86.70 | 87.79 | 88.41 | 90.48 |
| t5 @ 121° C., (30 min.) (min) | 28.33 | >30 | >30 | >30 | >30 |
| Ts2 @ 177° C. (30 min.) (min) | 0.54 | 0.49 | 0.53 | 0.53 | 0.55 |
| T90 @ 177° C. (30 min.) (min) | 5.08 | 4.40 | 4.85 | 4.18 | 4.65 |
| ML @ 177° C. (30 min.) (in-lb) | 1.81 | 2.33 | 2.16 | 2.16 | 2.48 |
| MH @ 177° C. (30 min.) (in-lb) | 37.97 | 38.68 | 37.75 | 32.35 | 33.11 |
| Original RT Physical Properties | | | | | |
| Hardness (Shore A) | 90 | 90 | 90 | 89 | 90 |
| Tensile strength (WG) (psi) | 2366 | 2058 | 2027 | 1874 | 1914 |

TABLE 6-continued

| Properties | Comp. Ex. 6 | Ex. 7 | Ex. 8 | Ex. 9 | Ex. 10 |
|---|---|---|---|---|---|
| Elongation (WG) (%) | 320 | 291 | 280 | 262 | 279 |
| Modulus at 5% (WG) (psi) | 665 | 663 | 682 | 579 | 731 |
| Modulus at 10% (WG) (psi) | 984 | 1006 | 976 | 842 | 1023 |
| Modulus at 20% (WG) (psi) | 1277 | 1295 | 1167 | 1036 | 1134 |
| Tear strength-Die C (WG) (kN/m) | 63.78 | 65.31 | 61.03 | 55.71 | 55.03 |
| Tear strength-Die C (XG) (kN/m) | 58.32 | 52.34 | 44.67 | 46.38 | 42.06 |
| Compression set (150° C., 22 hrs) (%) | 46.5 | 46.5 | 47.1 | 49.5 | 52.8 |
| Original 80° C. Physical Properties ||||||
| Tensile strength (WG) (psi) | 1472 | 1264 | 1186 | 1070 | 1039 |
| Elongation (WG) (%) | 268 | 265 | 254 | 257 | 265 |
| Modulus at 5% (WG) (psi) | 466 | 452 | 527 | 457 | 486 |
| Modulus at 10% (WG) (psi) | 699 | 681 | 700 | 586 | 613 |
| Modulus at 20% (WG) (psi) | 885 | 824 | 749 | 644 | 623 |
| Aged 70 hr.@150° C. RT Physical Properties ||||||
| Hardness (Shore A) | 91 | 91 | 90 | 90 | 90 |
| Tensile strength (WG) (psi) | 1957 | 1863 | 1795 | 1887 | 1768 |
| Elongation (WG) (%) | 103 | 134 | 152 | 222 | 238 |
| Modulus at 5% (WG) (psi) | 779 | 813 | 802 | 685 | 810 |
| Modulus at 10% (WG) (psi) | 1150 | 1204 | 1195 | 1021 | 1123 |
| Modulus at 20% (WG) (psi) | 1525 | 1573 | 1555 | 1323 | 1336 |
| Compression set (22 hr/150° C.) (%) | 35.3 | 38.3 | 38.0 | 42.3 | 48.0 |
| Other Properties ||||||
| DeMattia test-XG (80° C., 0.5") (kilocycles/inch) | 78 | 85 | 80 | 113 | 133 |
| DeMattia test-XG (100° C., 0.5") (kilocycles/inch) | 53 | 56 | 63 | 83 | 106 |
| PICO abrasion index | 77 | 71 | 64 | 63 | 51 |
| Tensile Fatigue Life (cycles) | 1240 | — | — | — | 2680 |

TABLE 7

Dynamic Properties[1]

| Property | Frequency (Hz) | Comp. Ex. 6 | Ex. 7 | Ex. 8 | Ex. 9 | Ex. 10 |
|---|---|---|---|---|---|---|
| G' at 100° C. | 0.033 | 3318.9 | 3403.7 | 3293.9 | 3133.3 | 3187.9 |
| | 0.083 | 3405.0 | 3492.5 | 3382.5 | 3216.5 | 3282.5 |
| | 0.167 | 3491.0 | 3583.8 | 3469.6 | 3306.8 | 3375.1 |
| | 0.333 | 3575.4 | 3671.8 | 3550.7 | 3389.6 | 3465.4 |
| | 0.833 | 3713.5 | 3812.1 | 3692.3 | 3526.5 | 3606.4 |
| | 1.667 | 3854.1 | 3948.1 | 3824.3 | 3677.2 | 3741.6 |
| | 3.333 | 3981.6 | 4082.7 | 3957.8 | 3799.0 | 3888.6 |
| | 8.333 | 4200.9 | 4322.8 | 4187.3 | 4037.6 | 4108.8 |
| | 16.667 | 4274.3 | 4490.5 | 4361.0 | 4200.5 | 4268.8 |
| | 33.333 | 4484.0 | 4624.7 | 4446.8 | 4323.5 | 4419.0 |
| tan δ at 100° C. | 0.033 | 0.129 | 0.140 | 0.144 | 0.158 | 0.172 |
| | 0.083 | 0.127 | 0.136 | 0.139 | 0.153 | 0.165 |
| | 0.167 | 0.129 | 0.136 | 0.139 | 0.153 | 0.163 |
| | 0.333 | 0.132 | 0.139 | 0.139 | 0.154 | 0.162 |
| | 0.833 | 0.138 | 0.143 | 0.143 | 0.158 | 0.165 |
| | 1.667 | 0.144 | 0.150 | 0.148 | 0.163 | 0.168 |
| | 3.333 | 0.142 | 0.151 | 0.147 | 0.165 | 0.167 |
| | 8.333 | 0.153 | 0.158 | 0.153 | 0.170 | 0.172 |
| | 16.667 | 0.172 | 0.159 | 0.148 | 0.167 | 0.182 |
| | 33.333 | 0.153 | 0.154 | 0.159 | 0.175 | 0.175 |
| G' at 80° C. | 0.033 | 3227.4 | 3373.8 | 3301.9 | 3077.2 | 3227.2 |
| | 0.083 | 3334.6 | 3477.5 | 3402.3 | 3194.0 | 3337.8 |
| | 0.167 | 3427.8 | 3574.9 | 3501.7 | 3289.5 | 3439.0 |
| | 0.333 | 3530.5 | 3679.5 | 3604.6 | 3393.4 | 3552.6 |
| | 0.833 | 3689.2 | 3840.3 | 3761.7 | 3552.3 | 3722.7 |
| | 1.667 | 3838.1 | 3996.1 | 3920.5 | 3715.7 | 3894.6 |
| | 3.333 | 3980.3 | 4146.0 | 4064.0 | 3854.1 | 4050.9 |
| | 8.333 | 4232.4 | 4426.3 | 4324.6 | 4089.0 | 4310.8 |
| | 16.667 | 4421.3 | 4583.6 | 4517.3 | 4261.1 | 4505.1 |
| | 33.333 | 4520.0 | 4775.3 | 4638.2 | 4395.9 | 4653.4 |
| tan at 80° C. | 0.033 | 0.136 | 0.144 | 0.144 | 0.164 | 0.170 |
| | 0.083 | 0.137 | 0.145 | 0.144 | 0.164 | 0.168 |
| | 0.167 | 0.141 | 0.147 | 0.146 | 0.165 | 0.169 |
| | 0.333 | 0.144 | 0.152 | 0.149 | 0.168 | 0.171 |
| | 0.833 | 0.150 | 0.157 | 0.154 | 0.172 | 0.175 |
| | 1.667 | 0.155 | 0.164 | 0.159 | 0.176 | 0.177 |
| | 3.333 | 0.157 | 0.165 | 0.157 | 0.176 | 0.177 |
| | 8.333 | 0.165 | 0.169 | 0.162 | 0.183 | 0.182 |
| | 16.667 | 0.153 | 0.186 | 0.161 | 0.182 | 0.183 |
| | 33.333 | 0.163 | 0.166 | 0.164 | 0.191 | 0.180 |

TABLE 7-continued

Dynamic Properties[1]

| Property | Frequency (Hz) | Comp. Ex. 6 | Ex. 7 | Ex. 8 | Ex. 9 | Ex. 10 |
| --- | --- | --- | --- | --- | --- | --- |
| G' at 66° C. | 0.033 | 3182.7 | 3369.2 | 3362.8 | 3028.1 | 3328.4 |
|  | 0.083 | 3293.7 | 3482.7 | 3476.5 | 3140.9 | 3443.3 |
|  | 0.167 | 3395.0 | 3593.1 | 3585.6 | 3242.7 | 3565.3 |
|  | 0.333 | 3498.7 | 3699.4 | 3696.0 | 3353.6 | 3681.6 |
|  | 0.833 | 3661.6 | 3877.3 | 3870.4 | 3524.1 | 3872.3 |
|  | 1.667 | 3822.3 | 4039.8 | 4037.0 | 3684.1 | 4051.0 |
|  | 3.333 | 3971.1 | 4201.1 | 4196.2 | 3831.2 | 4216.8 |
|  | 8.333 | 4238.2 | 4484.5 | 4446.4 | 4080.0 | 4493.0 |
|  | 16.667 | 4356.3 | 4699.3 | 4654.6 | 4210.6 | 4690.6 |
|  | 33.333 | 4552.5 | 4832.6 | 4799.4 | 4403.8 | 4860.7 |
| tan δ | 0.033 | 0.143 | 0.150 | 0.152 | 0.172 | 0.171 |
| at 66° C. | 0.083 | 0.146 | 0.153 | 0.153 | 0.173 | 0.173 |
|  | 0.167 | 0.149 | 0.157 | 0.156 | 0.175 | 0.175 |
|  | 0.333 | 0.152 | 0.159 | 0.159 | 0.177 | 0.176 |
|  | 0.833 | 0.158 | 0.165 | 0.164 | 0.181 | 0.180 |
|  | 1.667 | 0.164 | 0.171 | 0.169 | 0.186 | 0.183 |
|  | 3.333 | 0.162 | 0.170 | 0.166 | 0.184 | 0.182 |
|  | 8.333 | 0.169 | 0.175 | 0.171 | 0.192 | 0.186 |
|  | 16.667 | 0.180 | 0.168 | 0.163 | 0.201 | 0.181 |
|  | 33.333 | 0.170 | 0.173 | 0.171 | 0.196 | 0.185 |

[1]RPA frequency sweeps at 6.98% strain, in kPa units.

TABLE 8

Dynamic Properties[1]

| Property | Strain (%) | Comp. Ex. 6 | Ex. 7 | Ex. 8 | Ex. 9 | Ex. 10 |
| --- | --- | --- | --- | --- | --- | --- |
| G' at 66° C. | 0.7 | 5801.6 | 6468.3 | 6499.1 | 6040.3 | 6700.8 |
|  | 1.4 | 5162.0 | 5581.7 | 5619.9 | 5218.6 | 5787.2 |
|  | 2.79 | 4457.5 | 4827.3 | 4887.8 | 4465.1 | 4951.3 |
|  | 6.98 | 3867.1 | 4126.2 | 4143.3 | 3763.7 | 4155.6 |
|  | 13.95 | 3550.7 | 3734.0 | 3666.2 | 3355.8 | 3631.0 |
|  | 27.9 | 2857.8 | 3013.6 | 2911.1 | 2615.8 | 2814.1 |
|  | 69.75 | — | — | — | 1797.3 | 1842.4 |
| tan δ | 0.7 | 0.128 | 0.121 | 0.108 | 0.144 | 0.116 |
| at 66° C. | 1.4 | 0.156 | 0.156 | 0.147 | 0.177 | 0.153 |
|  | 2.79 | 0.177 | 0.180 | 0.171 | 0.196 | 0.180 |
|  | 6.98 | 0.166 | 0.170 | 0.165 | 0.185 | 0.178 |
|  | 13.95 | 0.160 | 0.168 | 0.175 | 0.188 | 0.194 |
|  | 27.9 | 0.173 | 0.178 | 0.188 | 0.209 | 0.217 |
|  | 69.75 | — | — | — | 0.238 | 0.266 |

[1]RPA strain sweep at 1.667 Hz frequency; G' is in kPa units.

The example compounds containing ionomer additives as described herein are useful in dynamic rubber articles including belts and hose. The primary benefit described is improved crack growth resistance, but other advantages may be obtained depending on the properties desired for the application. Rubber compounds of use in the practice of embodiments of the invention may advantageously contain ionomer additives such as EMMA or butyl ionomer at levels up to 50 phr, or preferably up to 30 phr, or up to 20 phr, or from 4 phr or 5 phr to 10 phr or 20 phr. Since these ionomer materials are generally thermoplastic (plastics), too high a level could make the rubber compound too stiff and/or thermoplastic in character for use in a dynamic rubber application. Too little ionomer might not result in the desired effect of increasing crack growth resistance. The benefits are expected to result in increased product life in dynamic rubber articles such as belts, at least in situations where a rubber cracking failure mode is observed.

Figure 2:
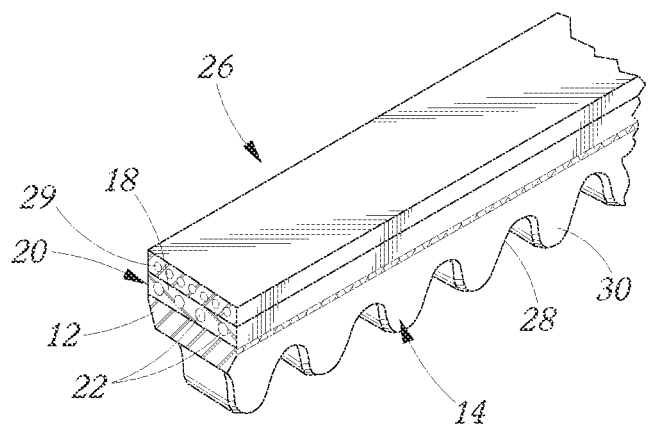
FIG. 2 is a perspective view, with parts in section, of a portion of a V-belt constructed in accordance with an embodiment of the present invention.
Figure 3:
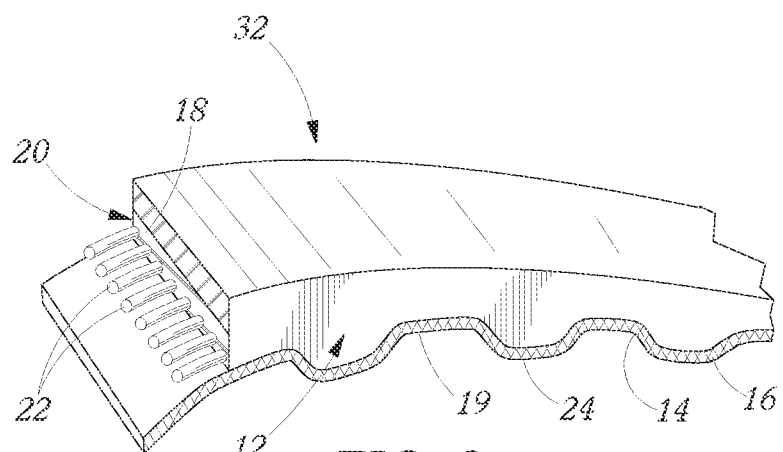
FIG. 3 is a perspective view, with parts in section, of a portion of a synchronous belt constructed in accordance with an embodiment of the present invention.

Referring now to FIG. 1, a multi-V-ribbed belt 10 in accordance with an embodiment of the present invention is shown generally. The multi-V-ribbed belt 10 includes an elastomeric main belt body portion 12, or undercord, and a sheave contact portion 14 positioned along the inner periphery of the main belt body portion 12. The word, "sheave" as used in this context includes conventional pulleys and sprockets used with a power transmission belt, and also rollers and like mechanisms. The particular sheave contact portion 14 of the belt of FIG. 1 is in the form of a plurality of ribs comprising raised areas or apexes 36 alternating with a plurality of trough areas 38 defining there between oppositely facing sides. In each of the instances of FIGS. 1-2, the sheave contact portion 14 is integral with the main belt body portion 12 and may be formed from the same elastomeric material(s) as described below. In FIG. 3 however, the sheave contact portion 14 can be seen to comprise a reinforcing fabric 24, explained in further detail below, as conventionally utilized in synchronous belt building configurations, and is thus formed of a material other than that of the main belt body portion 12 in that embodiment of the present invention.

A tensile or load-carrying cord section 20 is positioned above the undercord 12 for providing support and strength to the belt 10. In the illustrated form the tensile section comprises at least one longitudinally extending tensile cord 22, described in further detail below, aligned along the length of the belt, and in accordance with various embodiments of the present invention, is at least partially in contact with or is embedded in an adhesive rubber member 18 described in further detail below. The skilled practitioner would readily appreciate that in the several FIGS. 1-3, the adhesive rubber member 18 is illustrated in exaggerated form in order to visually distinguish it from the other elastomeric portions of the belt. In actuality, the cured composite is frequently visually indistinguishable from the surrounding elastomeric belt body portion except in cases, e.g., where one and not the other of the adhesive rubber member 18 and the undercord 12 is fiber loaded. The adhesive rubber member 18 may actually be of the same material as the elastomeric main belt body 12.

A reinforcing fabric (not shown in FIG. 1) may optionally be utilized and in the case of V-belts and multi-V-ribbed belts intimately fits along the surface of the belt opposite the sheave contact portion 14 to form a face cover or overcord for the belt. The fabric may be of any desired configuration such as a conventional weave consisting of warp and weft threads at any desired angle, or may consist of warp threads held together by spaced pick cords as exemplified by tire cord fabric, or of a knitted or braided configuration, or of a nonwoven configuration, or paper, or plastic film, and the like. The fabric may be friction- or skim-coated with the same or different elastomer composition as that of the elastomeric main belt body 12. More than one ply of fabric may be employed. If desired, the fabric may be cut or otherwise formed to be arranged on a bias so that the strands form an angle with the direction of travel of the belt. One embodiment of such reinforcing fabric use is shown in FIG. 2 wherein a rubber-skim coated tire cord fabric 29, is illustrated in exaggerated form. Usage of nonwoven or paper materials is described for example in U.S. Pat. No. 6,793,599 to Patterson et al., and the contents of that patent with respect to same are incorporated herein by reference. Usage of plastic film is described for example in U.S. Pat. Application Publication No. 20020187869, and the contents of that publication with respect to same are incorporated herein by reference.

Referring to FIG. 2, a standard notched V-belt 26 is illustrated. The V-belt 26 includes a main elastomeric belt body portion 12 similar to that illustrated in FIG. 1, and a tensile or load-carrying section 20 in the form of one or more tensile cords 22 embedded in an optional adhesive rubber member 18, also similar to that illustrated in FIG. 1. The main elastomeric belt body portion 12, adhesive rubber member 18 and load-carrying section 20 of the V-belt 26 may be constructed from the same materials as described above for FIG. 1.

The V-belt 26 also includes a sheave contact portion 14 as in the multi-V-ribbed belt 10 of FIG. 1. The side surfaces of the elastomeric main belt body portion 12, or in the case of a V-belt as illustrated, of the compression section, serve as the driving surfaces of the belt 26. In the embodiment illustrated, the sheave contact portion 14 is in the form of alternating notch depression surfaces or troughs 28 and toothed projections 30. These alternating depression surfaces 28 and projections 30 may preferably follow a generally sinusoidal path as illustrated which serves to distribute and minimize bending stresses as the sheave contact portion 14 passes around pulleys during operation.

While in the illustrated embodiment, the V-belt 26 is in the form of a raw-edged belt, a reinforcing fabric 29 as described above may moreover be employed, either as a face cover or overcord for the belt as shown, or fully encompassing the belt to form a banded V-belt.

Referring to FIG. 3, a toothed belt 32 is illustrated. The toothed belt 32 includes a main elastomeric belt body portion 12 and sheave contact portion 14 as in the case of the belts of FIGS. 1 and 2, and also includes a load-carrying section 20 as previously described for the belts of FIGS. 1 and 2. For the synchronous belt 32 however, the sheave contact portion 14 is in the form of alternating teeth 16 and land portions 19. A reinforcing fabric 24 as furthermore described above for the belts of FIGS. 1 and 2 may also be utilized and in this case intimately fits along the alternating teeth 16 and land portions 19 of the belt 32 to form a face cover therefor.

In each of the cases of FIGS. 1-3 shown above, the main belt body portion 12 may be formed of any conventional and/or suitable cured elastomer composition, and may be of the same as or different from that described below in relation to the optional adhesive rubber member 18. The elastomer composition includes an ionomeric polymer additive as described generally herein and in connection with the specific examples herein. The ionomeric polymer additive may be polyethylene-methacrylic acid copolymer or butyl ionomer. The polyethylene-methacrylic acid copolymer may have at least a portion of its acid groups neutralized. The ionomeric polymer additive may be present in the rubber composition at a concentration of up to 50 phr. Other features have been described above.

Suitable elastomers that may be utilized for this purpose include for example polyurethane elastomers (including as well polyurethane/urea elastomers) (PU), polychloroprene rubber (CR), acrylonitrile butadiene rubber (NBR), hydrogenated NBR (HNBR), styrene-butadiene rubber (SBR), alkylated chlorosulfonated polyethylene (ACSM), epichlorohydrin, polybutadiene rubber (BR), natural rubber (NR), and ethylene alpha olefin elastomers such as ethylene propylene copolymers (EPM), ethylene propylene diene terpolymers (EPDM), ethylene octene copolymers (EOM), ethylene butene copolymers (EBM), ethylene octene terpolymers (EODM); and ethylene butene terpolymers (EBDM); ethylene vinylacetate elastomers (EVM); ethylene methylacrylate (EAM); and silicone rubber, or a combination of any two or more of the foregoing.

The mixing of the rubber compositions may be carried out using any of the known methods or equipment for mixing rubber compounds, including internal mixers, extruders, rubber mills, and the like.

To form the elastomeric belt body portion 12 in accordance with an embodiment of the present invention, the elastomer(s) may be blended with conventional rubber compounding ingredients including fillers, plasticizers, stabilizers, vulcanization agents/curatives and accelerators, in amounts conventionally employed. For example, for use with ethylene-alpha-olefin elastomer and diene elastomers such as HNBR, one or more metal salts of alpha-beta organic acids may be employed in amounts now conventionally utilized to improve dynamic performance of the resultant article. Thus zinc dimethacrylate (ZDMA) and/or zinc diacrylate may be utilized in such compositions in amounts of from about 1 to about 50 phr; or alternatively of from about 5 to about 30 phr; or of from about 10 to about 25 phr. These materials furthermore contribute to the adhesiveness of the composition, and increase the overall cross-link density of the polymer upon curing with peroxide or related free-radical cure agents through ionic crosslinking. The Examples described herein used ZDMA as coagent. Preferably the rubber compositions are peroxide cured or cured by another free-radical mechanism.

One skilled in the relevant art would readily appreciate any number of suitable compositions for utilization in or as the elastomeric portions of the belt. A number of suitable elastomer compositions are described for example in The R. T. Vanderbilt Rubber Handbook (13$^{th}$ ed., 1996), and with respect to EPM or EPDM compositions and such compositions having particular high tensile modulus properties, are furthermore set forth in U.S. Pat. Nos. 5,610,217, and 6,616,558 respectively, the contents of which, with respect to various elastomer compositions that may be suitable for use in the formation of power transmission belt body portions, are specifically incorporated herein by reference. To any of these rubber formulations, the ionomer may be added to improve flex fatigue properties or crack growth resistance according to an embodiment of the invention.

In an embodiment of the present invention associated with automotive accessory drive applications, the elastomeric belt body portions 12 may be formed of a suitable ethylene alpha olefin composition, such as an EPM, EPDM, EBM or EOM composition, which may be the same or different composition as that employed as the adhesive rubber member composition.

The elastomeric main belt body portion 12 may moreover be loaded with discontinuous fibers as is well known in the art, utilizing materials such as including but not limited to cotton, polyester, fiberglass, aramid and nylon, in such forms as staple- or chopped fibers, flock or pulp, in amounts generally employed. In a preferred embodiment relating to profiled (e.g., as by cutting or grinding) multi-v-ribbed belts, such fiber loading is preferably formed and arranged such that a substantial portion of the fibers are formed and arranged to lay in a direction generally transverse the direction of travel of the belt. In molded multi-v-ribbed belts and/or synchronous belts made according to flow through methods however, the fiber loading would generally lack the same degree of orientation.

In accordance with one embodiment of the present invention, the cured composition for utilization in at least partial contact with the load carrier cord within the composite belt structure as described in several embodiments above for FIGS. 1-3 may optionally include the features and benefits thereof described in detail in aforementioned U.S. Pat. No. 6,616,558, the contents of which have been incorporated herein by reference.

In operation, the belt is generally trained about at least one driver pulley and one driven pulley to form a belt drive or drive system, optionally in combination with an idler pulley and/or other pulleys.

Likewise hoses utilizing rubber compositions according to an embodiment of the invention may be subject to repeated pressure impulses or flexing and therefore benefit from the invention in the form of increased life and/or decreased crack growth rates. A hose typically includes one or more rubber layers and one or more reinforcement layers. The reinforcement layers may be textiles, cords or wires, which may be wrapped or wound or braided. There may also be tie layers to bond various layers together, and the tie layers may also be rubber compositions. FIG. 7 shows exemplary hose embodiment 71, including inner tube layer 72, reinforcement layer 74, and outer cover layer 76. Any of the rubber compositions utilized in the hose may advantageously include an ionomeric polymer additive as described generally herein and in connection with the specific examples herein. The ionomeric polymer additive may be polyethylene-methacrylic acid copolymer or butyl ionomer. The polyethylene-methacrylic acid copolymer may have at least a portion of its acid groups neutralized. The ionomeric polymer additive may be present in the rubber composition at a concentration of up to 50 phr. Other features have been described above in connection with belts and generally.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A power transmission belt comprising an elastomeric belt body, said body comprising a rubber composition comprising an ionomeric polymer additive; wherein said ionomeric polymer additive comprises polyethylene-methacrylic acid random copolymer wherein said polyethylene-methacrylic acid copolymer has at least a portion of its acid groups neutralized.

2. The belt of claim 1 wherein said ionomeric polymer additive is present in said rubber composition at a concentration of up to 50 phr.

3. A power transmission belt comprising an elastomeric body, said body comprising a rubber composition comprising an ionomeric polymer additive;
wherein said ionomeric polymer additive comprises polyethylene-methacrylic acid random copolymer with at least a portion of its acid groups neutralized;
and wherein said ionomeric polymer additive is present in said rubber composition at a concentration of up to 50 phr.

4. A method of increasing crack growth resistance in power transmission belts comprising a rubber body subject to flexing in use comprising:
adding an ionomeric polymer additive to a rubber composition used to form said rubber body;
wherein said ionomeric polymer additive comprises polyethylene-methacrylic acid random copolymer with at least a portion of its acid groups neutralized.

5. The method of claim 4 wherein said polyethylene-methacrylic acid random copolymer is present in said rubber composition at a concentration of about 4 phr to about 8 phr.

* * * * *